UNITED STATES PATENT OFFICE.

LOUIS W. WOLLENWEBER, OF JEFFERSONVILLE, INDIANA.

IMPROVEMENT IN MEDICAL COMPOUNDS.

Specification forming part of Letters Patent No. 132,424, dated October 22, 1872.

*To all whom it may concern:*

Be it known that I, LOUIS W. WOLLENWEBER, of the city of Jeffersonville, in the State of Indiana, have invented a certain Compound (WOLLENWEBER'S Aromatic Stomach-Bitters) to be used for the cure of dyspepsia, chills and fever, bilious remittent and intermittent fevers, jaundice, and other similar diseases; and the following is a specification thereof:

The nature of this my invention consists in mixing together in soft water the following ingredients, viz: Angelica root, calamus, gentian, herb absinthe, Peruvian bark, orange peel, nutmegs, cloves, laurel leaf, and anise-seed, the water being first boiled and permitted to get cold.

To prepare the above aromatic stomach-bitters I take one-fourth of a barrel of soft water after being boiled, and having stood until perfectly cold, to which I add the following ingredients, in their several proportions, viz: four ounces angelica root; two and one-half ounces calamus root; two and one-half ounces gentian; one and three-fourths ounce herb absinthe; one and three-fourths ounce Peruvian bark; one and one-half ounce orange peel; one and one-half ounce nutmegs; one and three-fourths ounce cloves; one and three-fourths ounce laurel leaves; one and three-fourths ounce anise-seed; after which I stir the whole mass briskly for a short time; then let it stand for a few hours; then seal it up and let it stand for several days, in order that the strength of the several ingredients may be thoroughly extracted, when it is ready for use, and is not liable to ferment or get sour by standing, if kept in a cool place and securely closed up.

These bitters may be used with great benefit to persons in a delicate state of health, particularly where the system has been much debilitated by disease, the dose being about a wine-glassful before eating each meal.

I claim as my invention—

The compound composed of the several ingredients, as described, substantially in their several proportions, and for the use and purpose hereinbefore set forth.

LOUIS W. WOLLENWEBER.

Witnesses:
JULIUS BARBAROUX,
E. F. HUYCK.